(12) United States Patent
Chen et al.

(10) Patent No.: US 9,829,757 B2
(45) Date of Patent: Nov. 28, 2017

(54) TRANSPARENT DISPLAY DEVICE AND DISPLAY METHOD THEREOF

(71) Applicant: AU Optronics Corporation, Hsin-Chu (TW)

(72) Inventors: Kuo-Tsung Chen, Hsin-Chu (TW); Cho-Yan Chen, Hsin-Chu (TW); Ching-Huan Lin, Hsin-Chu (TW); Chu-Yu Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/191,620

(22) Filed: Jun. 24, 2016

(65) Prior Publication Data

US 2016/0306215 A1  Oct. 20, 2016

Related U.S. Application Data

(63) Continuation of application No. 13/661,421, filed on Oct. 26, 2012, now abandoned.

(30) Foreign Application Priority Data

Oct. 28, 2011  (TW) .............................. 100139270 A

(51) Int. Cl.
*G09G 5/10* (2006.01)
*G02F 1/1347* (2006.01)
(Continued)

(52) U.S. Cl.
CPC ....... *G02F 1/13471* (2013.01); *G02B 6/0026* (2013.01); *G02F 1/13306* (2013.01);
(Continued)

(58) Field of Classification Search
CPC ........... G02F 1/13471; G02F 1/133621; G02F 1/133617; G02F 1/133615; G02B 6/0056; H01L 27/3267
(Continued)

(56) References Cited

U.S. PATENT DOCUMENTS 5,087,985 A * 2/1992 Kitaura .................... G02B 1/08
                                                     252/588
5,608,554 A  3/1997 Do et al.
(Continued)

FOREIGN PATENT DOCUMENTS

CN  1132051 C  11/1999
EP  1793261 A1 * 6/2007 ............. G02B 27/01
(Continued)

OTHER PUBLICATIONS

Thorlabs Product Catalog, Copyright 1999-2015.*
(Continued)

*Primary Examiner* — Yuzhen Shen
(74) *Attorney, Agent, or Firm* — McClure, Qualey & Rodack, LLP

(57) ABSTRACT

A display device includes a light source module, a first light modulation module, a first polarizer layer, and a first color modulation layer. The light source module generates a first color light that is polarized to the first light modulation module, wherein the first light modulation module selectively modulates the polarization direction of the first color light. The first polarizer layer then receives the first color light and selectively blocks, partially blocks, or does not block the first color light from passing through. The first color modulation layer receives the first color light and generates a second color light.

20 Claims, 13 Drawing Sheets

(51) Int. Cl.
*G02F 1/1335* (2006.01)
*G02F 1/133* (2006.01)
*F21V 8/00* (2006.01)

(52) U.S. Cl.
CPC .... *G02F 1/13362* (2013.01); *G02F 1/133514* (2013.01); *G02F 1/133528* (2013.01); *G02B 6/0056* (2013.01); *G02B 6/0063* (2013.01); *G02F 2001/133614* (2013.01)

(58) Field of Classification Search
USPC .............................................. 349/62, 70, 71
See application file for complete search history.

(56) References Cited

U.S. PATENT DOCUMENTS

| | | | |
|---|---|---|---|
| 6,445,431 B2 | 9/2002 | Nose et al. | |
| 6,614,179 B1 | 9/2003 | Shimizu et al. | |
| 6,844,903 B2 | 1/2005 | Mueller-Mach et al. | |
| 7,079,207 B2 * | 7/2006 | Kashima | G02F 1/133514 349/106 |
| 7,630,028 B2 | 12/2009 | Wang et al. | |
| 7,671,529 B2 | 3/2010 | Mueller et al. | |
| 7,746,423 B2 * | 6/2010 | Im | B82Y 10/00 349/69 |
| 8,670,089 B2 | 3/2014 | Hung et al. | |
| 2001/0035928 A1 | 11/2001 | Kuroiwa et al. | |
| 2002/0145685 A1 | 10/2002 | Mueller-Mach et al. | |
| 2006/0238671 A1 | 10/2006 | Kim et al. | |
| 2007/0058107 A1 | 3/2007 | Im et al. | |
| 2008/0158480 A1 * | 7/2008 | Ii | G02F 1/133617 349/71 |
| 2011/0013123 A1 * | 1/2011 | Park | G02B 6/0036 349/96 |
| 2011/0050551 A1 * | 3/2011 | Ota | G02F 1/134363 345/87 |
| 2011/0261291 A1 | 10/2011 | Park et al. | |
| 2011/0299010 A1 | 12/2011 | Park et al. | |
| 2012/0262190 A1 | 10/2012 | Kondo et al. | |

FOREIGN PATENT DOCUMENTS

| | | |
|---|---|---|
| JP | 2007178902 | 7/2007 |
| JP | 2007207615 | 8/2007 |
| TW | 200410009 | 6/2004 |
| TW | I240837 | 10/2005 |
| TW | M285714 | 1/2006 |
| TW | 200643549 | 12/2006 |
| TW | I285282 | 8/2008 |
| TW | 201028768 A1 | 8/2010 |
| WO | 2011077949 A1 | 6/2011 |

OTHER PUBLICATIONS

English translation of abstract of TW I285282, dated Aug. 11, 2007.
English translation of abstract of JP 2007178902, dated Jul. 22, 2007.
English translation of abstract of TW M285714, dated Jan. 11, 2006.
English translation of abstract of TW 200643549, dated Dec. 16, 2006.
English translation of abstract of JP 2007207615, dated Aug. 16, 2007.
English translation of abstract of TW 200410009, dated Jun. 16, 2004.
English translation of abstract of TW I240837, dated Oct. 1, 2005.
China Office Action dated Jan. 6, 2014.
Taiwan Office Action dated Sep. 24, 2014.

* cited by examiner

TRANSPARENT DISPLAY DEVICE AND DISPLAY METHOD THEREOF

BACKGROUND OF THE INVENTION

1. Field of the Invention

The present invention generally relates to a display device. Particularly, the present invention relates to a display device that can simultaneously display images as well transparently view the background and an image display method thereof.

2. Description of the Related Art

In recent years, flat panel display devices have been widely used in various fields as simply display devices or may also be implemented into electronic devices to be used as devices for the display of data. There are many types of flat panel display devices, wherein liquid crystal display devices are currently the most commonly seen flat panel displays.

FIG. 1 illustrates a schematic diagram of a conventional liquid crystal display device. As shown in FIG. 1, the conventional liquid crystal display device includes a backlight module 10, a liquid crystal panel 30, and a color filter film 50. The backlight module 10 generates backlight 11 and emits the backlight 11 towards the liquid crystal panel 30. An upper polarizer film 31 and a lower polarizer film 33 are separately disposed on two sides of the liquid crystal panel 30. When the backlight 11 passes through the lower polarizer film 33, the lower polarizer film 33 polarizes the backlight 11 such that the backlight 11 has the same polarization direction as the lower polarizer film 33. The backlight 11 then enters the liquid crystal panel 30 and undergoes polarization modulation by the arrangement of liquid crystal molecules of each pixel within the liquid crystal panel 30. The backlight 11 then passes through the color filter film 50 to be filtered of unwanted color spectrums. When the backlight 11 exits the liquid crystal panel 30 and arrives at the upper polarizer film 31, the upper polarizer film 31 controls amount of light of each pixel by only allowing the part of the backlight 11 that has the same polarization direction as the upper polarizer film 31 to pass through while blocking the part of the backlight 11 that has a polarization direction perpendicular to the polarization direction of the upper polarizer film 31.

In terms of these types of conventional liquid crystal display devices, the conventional liquid crystal display device may only display images. They are themselves not transparent to allow the background behind the device to be seen through the device from the front. However, in certain situations, such as the heads-up display (HUD) on the windshield of automobiles or information displays on display cabinets, there may be a need for displaying images while also simultaneously allowing background objects to be viewed through the display device. Therefore, the conventional liquid crystal display device is unable to satisfy these types of requirements.

SUMMARY OF THE INVENTION

It is an object of the present invention to provide a display device and a display method thereof that is capable of displaying images while simultaneously allowing transparent viewing of the background behind the device.

It is another object of the present invention to provide a display device and a display method thereof that provides users with controls to select whether the display device is transparent or not transparent.

It is another object of the present invention to provide a display device and a display method thereof that can take into account the brightness of displaying images and transparently viewing the background.

The display device includes a light source module, a first light modulation module, a first polarizer layer, and a first color modulation layer. The light source module generates a first color light, emitting the first color light to the first light modulation module, wherein the first color light is a polarized light with a specific polarization direction or polarity. The first light modulation module is disposed on the light source module to receive the first color light exiting the light source module. The first modulation module may selectively modulate or not modulate the polarization direction of the first color light according to the input of an image signal. The first polarizer layer is disposed on the first light modulation module facing away from the light source module, and receives the first color light passing through the first light modulation module. The first polarizer layer, according to the polarization direction of the first color light passing through the first light modulation module, selectively blocks, partially blocks, or does not block the first color light. The first color modulation layer has light transparency properties and is disposed on a surface of the first light modulation module facing away from the first polarizer layer. A second color light is generated after the first color light passing through the first polarizer layer enters the first color modulation layer.

Through this design, the first color light generated by the light source module may control the light levels of the transparent view for the first polarizer layer after being modulated by the first light modulation module, such that images to be displayed may be generated. Whereas, light from the background entering the display device from the backside of the light source module may also pass through the first light modulation module, the first polarizer layer, and the first color modulation layer to produce a transparent viewing effect. In other words, users may see images display by the display device while also simultaneously view background objects behind the display device.

The image display method mainly includes two parts of displaying the image and transparently viewing the background. From the stand point of displaying images, the first color light generated by the light source module is made to be radiated onto the first light modulation module. The first light modulation module is then controlled to selectively modulate or not modulate the polarization direction of the first color light. The first polarizer layer is used to selectively block, partially block, or not block the passage of the first color light in accordance to the polarization direction of the first color light passed through the first modulation module. The first color light that passed through the first modulation module is then made to pass through the first color modulation layer in order to generate the second color light. In terms of transparently viewing the background, background light entering from the backside of the light source module passes through the first light modulation module, since it has no specific polarization, to accomplish the transparent viewing effect. The display device may display images while simultaneously allow transparent viewing of the background.

DETAILED DESCRIPTION OF THE PREFERRED EMBODIMENT

The present invention provides a transparent display device and a display method thereof. In a preferred embodiment, the display device of the present invention is a liquid crystal display, wherein the light source is preferably light emitting diodes (LED). However, in other different embodiments, other light modulation devices of non-liquid crystal modules, or other types of display devices not using light-emitting diodes as light sources may be utilized.

Figure 1:
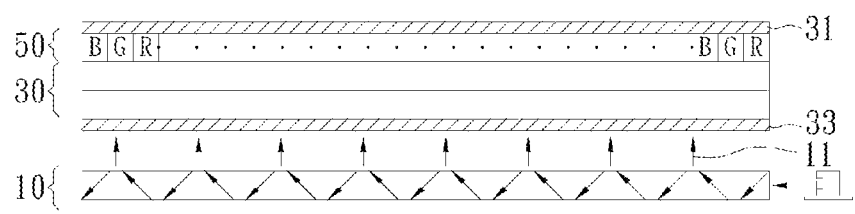
FIG. 1 is a schematic view of the conventional display device.
Figure 2:
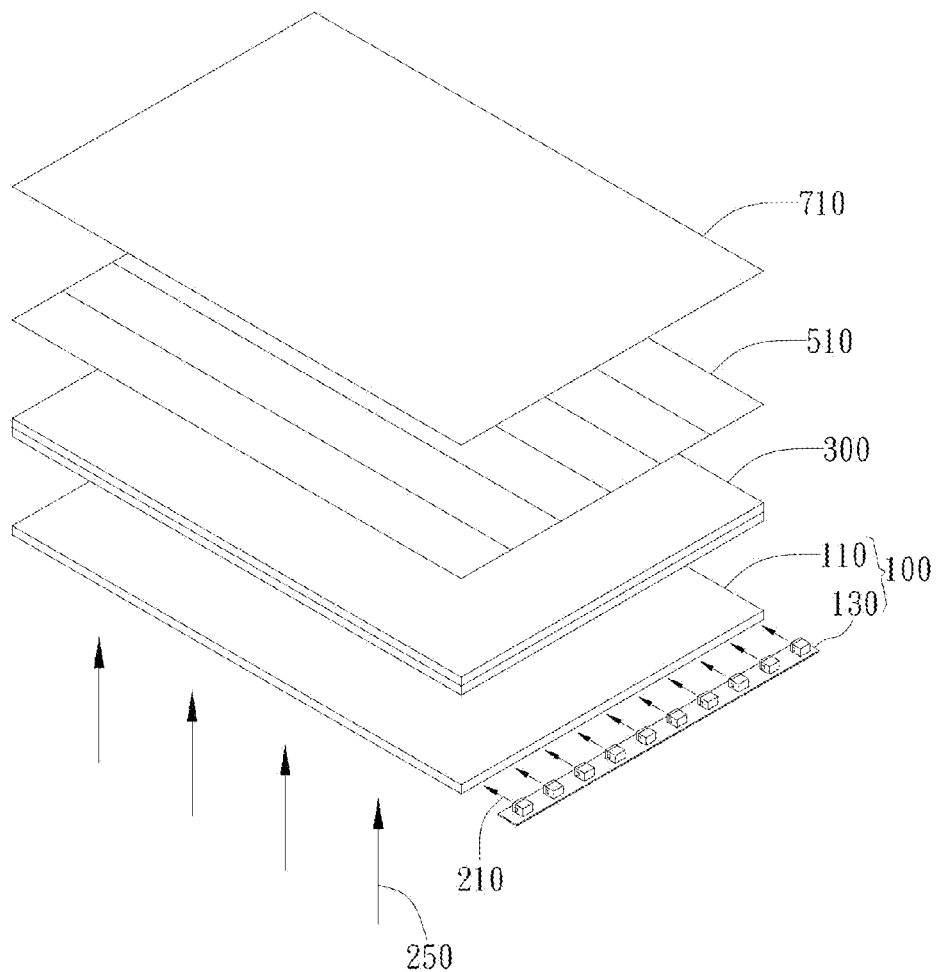
FIG. 2 is an exploded view of an embodiment of the display device of the present invention.

As shown in FIG. 2, the display device includes a light source module 100, a first light modulation module 300, a first polarizer layer 510, and a first color modulation layer 710. The light source module 100 generates a first color light 210, emitting the first color light 210 to the first light modulation module 300, wherein the first color light 210 is a polarized light. In a preferred embodiment, the first color light 210 is a blue light or an ultraviolet light that preferably has a wavelength lower than 410 nm. By setting the wavelength to being lower than 410 nm, the first color light 210 may be distinguished from a background light entering from behind the light source module 100. This portion will be further explained in detail afterwards.

In a preferred embodiment, the light source module 100 includes a light guide plate 110 and a polarized light source 130. The transparency of the light guide plate 110 is preferably higher than 90% in order to allow the background light 250 entering from behind to generate an effect of transparent viewing. The light guide plate 110 has a first light-emitting surface 111 facing the first light modulation module 300 and a light entrance surface 113 that is located on a side of the light guide plate 110. The polarized light source 130 is disposed corresponding to the light entrance surface 113 and generates the first color light 210 entering into the light guide plate 110 from the light entrance surface 113. The first color light 210, after being guided by the light guide plate 110, is emitted from the light guide plate 110 from the first light-emitting surface 113. The first color light 210 is preferably a circular polarized light so that circumstances of the first color light 210 changing polarization directions after transmission in the light guide plate 110 may be decreased. However, in other different embodiments, the first color light 210 may also be a linear polarized light. In this instance, corresponding microstructures are preferably disposed on a bottom surface of the light guide plate 110 to decrease the circumstance of the polarization directions changing.

Figure 3:
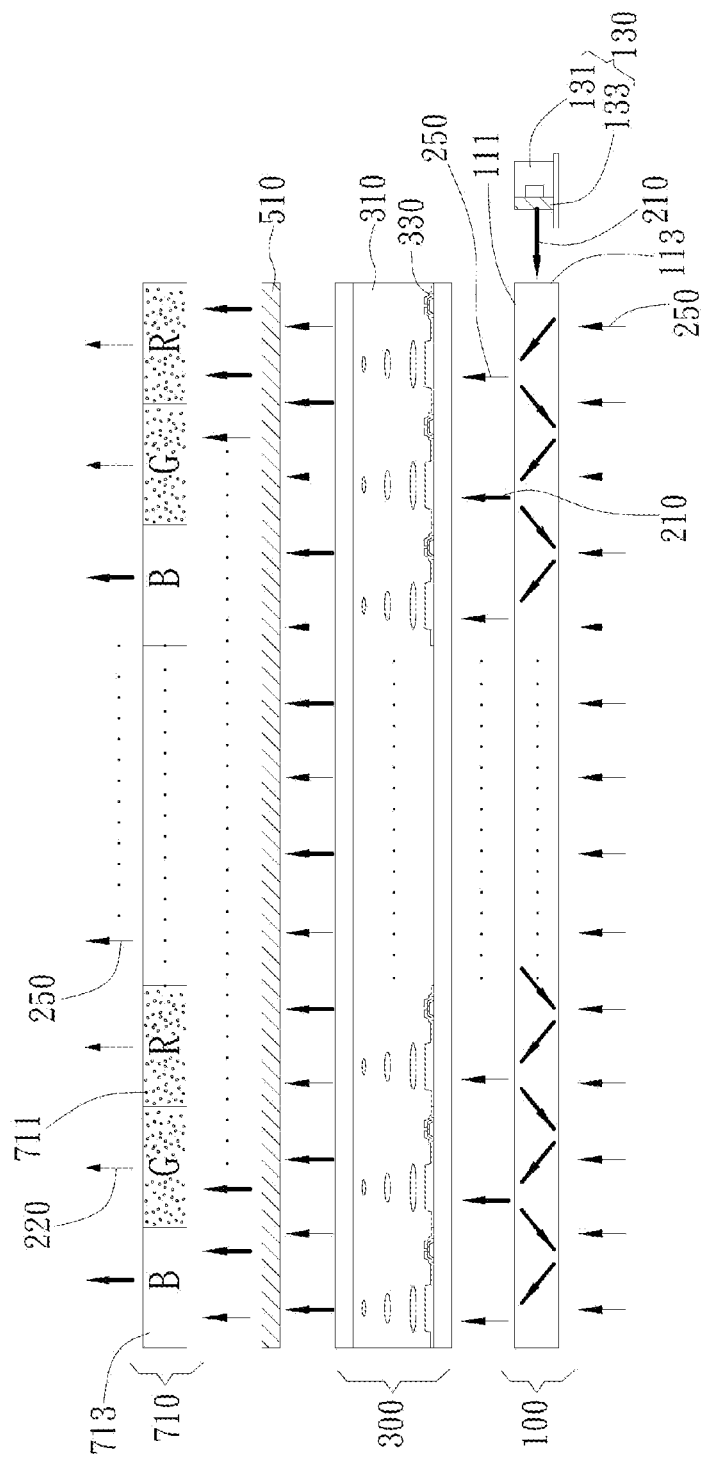
FIG. 3 is a cross-sectional view of an embodiment of the display device of the present invention.

Furthermore, as shown in the embodiment of FIGS. 2 and 3, the polarized light source 130 preferably includes a light source 131 and a polarizer film 133. The light source 131 may be blue light-emitting diodes generating non-polarized light. The polarizer film 133 is disposed between the light source 131 and the light entrance surface 113 of the light guide plate 110 so that the light generated by the light source 131 may be polarized. However, in other different embodiments, the polarized light source 130 may also be modularized light-emitting diodes that produce polarized light so that the process of assembling may be simplified.

As shown in FIGS. 2 and 3, the first light modulation module 300 is disposed on the light source module 100. In terms of the preferred embodiment, the first light modulation module 300 is disposed corresponding to the first light-emitting surface 111 of the light guide plate 110 in order to receive the first color light 210 emitted from the first light-emitting surface 111. The first light modulation module 300 may selectively modulate or not modulate the original polarity or polarization direction of the first color light 210. The modulation referred to herein means the original polarization direction of the first color light 210 may be changed to a direction that is not the same as the original direction, wherein the angle of modulation may be anywhere from 0 to 90 degrees.

In a preferred embodiment as shown in FIG. 3, the first light modulation module includes a first liquid crystal layer 310 and a first control circuit layer 330. The first control circuit layer 330 accepts external image control signals such that electrodes in the first control circuit layer 330 may generate voltage to control the orientation and arrangement of liquid crystal molecules of the first liquid crystal layer 310. For instance, under twisted nematic (TN) mode of driving liquid crystals, when the first control circuit layer 330 is not generating voltage, the liquid crystal molecules form screw-like arrangement. In this form, the liquid crystal molecules will guide the first color light 210 to change in the polarization direction. When the first control circuit layer 330 lowers the voltage or does not generate any voltage, the rotational angle of the liquid crystal molecules will become smaller or the liquid crystal molecules may change to a vertical alignment. In this form, the change in polarization direction of the first color light 210 will decrease or will not change.

As shown in FIGS. 2 and 3, the first polarizer layer 510 is disposed on a side of the first light modulation module 300 facing away from the light source module 100. The first polarizer layer 510 receives the first color light 210 that passed through the first light modulation module 300. In other words, the first color light 210 arriving at the first polarizer layer 510 has already been modulated in polarity by the first light modulation module 300, wherein the polarization direction may or may not be the same as its original polarization direction before entering the first light modulation module 300 in accordance with the image control signal. The first polarizer layer 510 selectively completely blocks, partially blocks, or does not block the first color light 210 according to the polarization direction of the first color light 210 after it has passed through the first light modulation module 300.

More specifically, the first polarizer layer 510 has a first polarization direction, wherein the first polarization direction is preferably the same or is perpendicular to the original polarization direction of the first color light 210. In terms of twisted nematic mode of driving liquid crystals as an example, the first polarization direction is perpendicular to the polarization direction of the first color light 210 that has just left the light source module 100. In other words, the first light modulation module 300 rotates the polarization direction of the first color light 210 by 90 degrees to be the same direction as the first polarization direction such that after the first color light 210 has been rotated, the first color light 210 may pass through the first polarizer layer 510. Conversely, when the first light modulation module 300 does not change the original polarization direction of the first color light 210, the first color light 210 will be blocked by the first polarizer layer 510 and will not be able to pass through.

Figure 4:
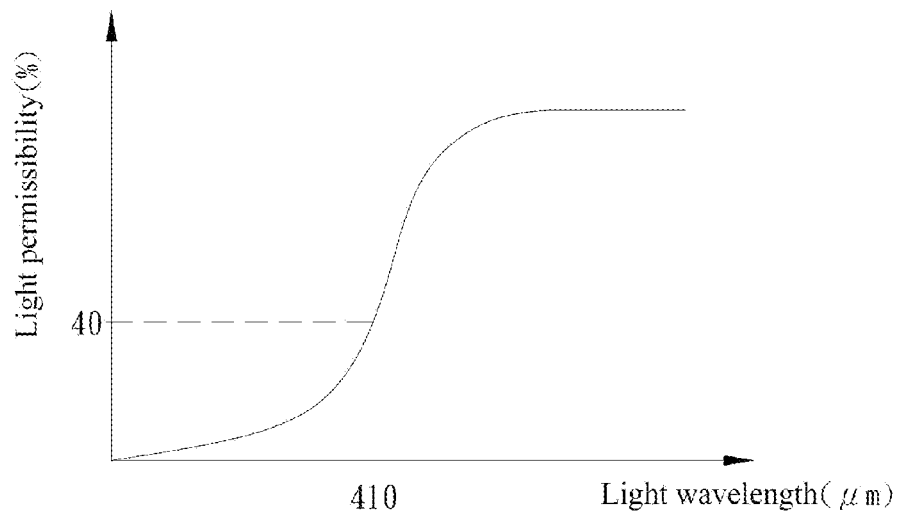
FIG. 4 is a diagram of the relationship between light transmittance and light wavelength of the first polarizer layer of the present invention.

In addition, in a preferred embodiment, the first polarizer layer 510 has a light transmittance of greater than 40% for light having a wavelength of 410 nm and a polarization direction the same as the first polarization direction. FIG. 4 illustrates a preferred embodiment of the relationship between the wavelength of incident light and the light transmittance of the first polarizer layer 510. As shown in FIG. 4, the first polarizer layer 510 has better light transmittance for incident light that has longer wavelengths. In the present embodiment, when the wavelength of the incident light is around 410 nm, there is sufficient light transmittance. When the polarization direction of the first color light 210 that has relatively shorter wavelength is the same as the first polarization direction, the first polarizer layer 510 allows the first color light 210 to pass through at a higher light transmittance.

As shown in FIGS. 2 and 3, the first color modulation layer 710 is disposed on a surface of the first light modulation module 300 facing away from the first polarizer layer 510. The first color light 210 enters the first color modulation layer 710 after passing through the first polarizer layer 510 to generate a second color light 220. In a preferred embodiment, the second color light 220 may be green light or red light. However, in other different embodiments, yellow light or white light composed of mixed lights may be utilized. In another embodiment, a portion of the first color light 210 may also directly pass through and emit out of a specific portion of the first color modulation layer 710 without generating the second color light 220. The first color modulation layer 710 preferably includes a photoluminescent material 711, such as green or red phosphors that can be excited by blue or ultraviolet light, to generate different colored light through light excitation in order to decrease the loss of light due to light filtering for color adjustments. Photoluminescent material 711 preferably is excited correspondingly to blue or ultraviolet light with light wavelengths not greater than 410 nm. Since the background light 250 formed from the environment light has fewer amounts of light with wavelengths not greater than 410 nm, the circumstance of the photoluminescent material 711 being excited to generate the second color light 220 by the background light 250 when the background light 250 passes through the first color modulation layer 710 may be decreased such that the image quality of the display device may be maintained.

In order for the background light 250 to produce the effect of transparent viewing, the first color modulation layer 710 has light transmittance properties. In a preferred embodiment, the first color modulation layer 710 has light transmittance greater than 80%.

Through this design, after being modulated by the first light modulation module 300, the first color light 210 generated by the light source module 100 passes through the first polarizer layer 510, wherein the amount of light that passes through is controlled by the first polarizer layer 510. The light then enters the first color modulation layer 710 to excite different color phosphors, generating different color light, to generate the desired display images. On the other hand, background light 250 entering the display device from behind the light source module 100 is a non-polarized light. Therefore, the background light 250 may also pass through the first light modulation module 300, the first polarizer layer 510, and the first color modulation layer 710 to generate the effect of transparent viewing. In other words, users may see the images displayed by the display device while also simultaneously see objects in the background behind the display device.

Figure 5:
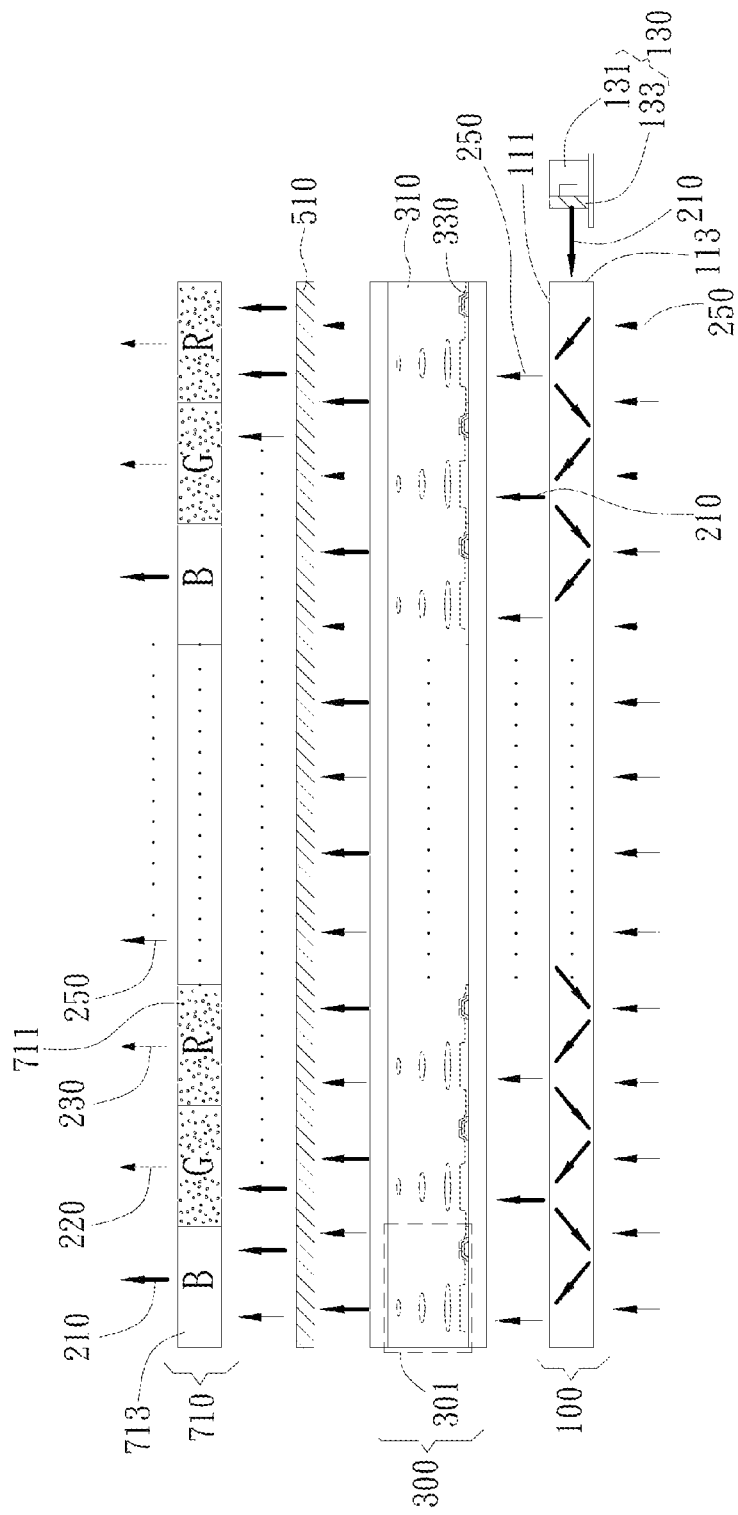
FIG. 5 is a cross-sectional view of another embodiment of the display device of the present invention.

In the embodiment of FIG. 5, the first light modulation module 300 includes a plurality of first pixel units 301 distributed on the first light modulation module 300, wherein the first pixel unit 301 consists of the liquid crystal layer 310 and the first control circuit layer 330. In addition, a plurality of first color modulation units 713 may be formed on the first color modulation layer 710 corresponding to the plurality of first pixel units 301, wherein both the first pixel units 301 and the first color modulation units 713 are preferably aligned on the traveling path. After the first control circuit layer 330 receives the image control signal, the orientation of the liquid crystal molecules are controlled by corresponding electrodes in different first pixel units 301. The first color light 210 is modulated by different first pixel units 301 such that the first color light 210 may have different polarization directions at different locations on the first light modulation module 300. The first color light 210 having different polarization directions then separately enter the first polarizer layer 510. Since different first pixel units 301 emit first color light 210 of different polarization directions, the amount of light passing through the first polarizer layer 510 will also be different. After the first color light 210 emitted from each of the first pixel units 301 passes through the first polarizer layer 510, they separately enter the corresponding first color modulation units 713 to each excite to generate a second color light 220, even a third color light 230, or the first color light 210 may directly pass through. The lights emitted from different first color modulation units 713 each have defined brightness such that their composition forms an image.

Figure 6:
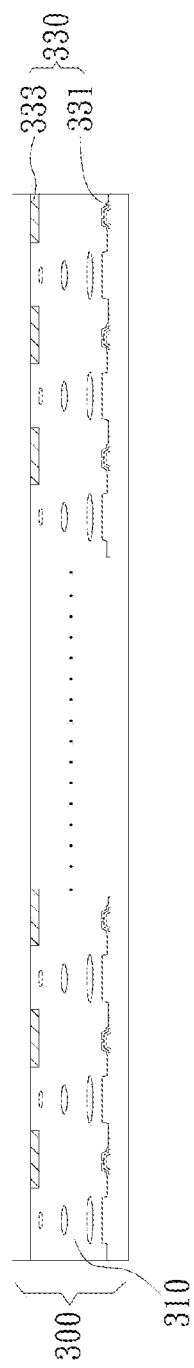
FIG. 6 is a schematic view of an embodiment of the first control circuit layer.

As shown in FIG. 6, the first control circuit layer 330 includes a metallic circuit path 331 and a shielding unit 333. The metallic circuit path 331 is distributed on the substrate 350 and may include electronic components such as thin film transistors, as well as signal circuits for transmission of signals. The shielding unit 333 shields a side of the first polarizer film 510 on top of the metallic circuit path 331 in order to decrease light reflections so that the visual quality may be increased. The shielding unit 333 is preferably a light absorbance material of dark color that is formed on an upper substrate 380 corresponding to the substrate 350 and covers in a projection manner on top of the metallic circuit path 331.

Figure 7:
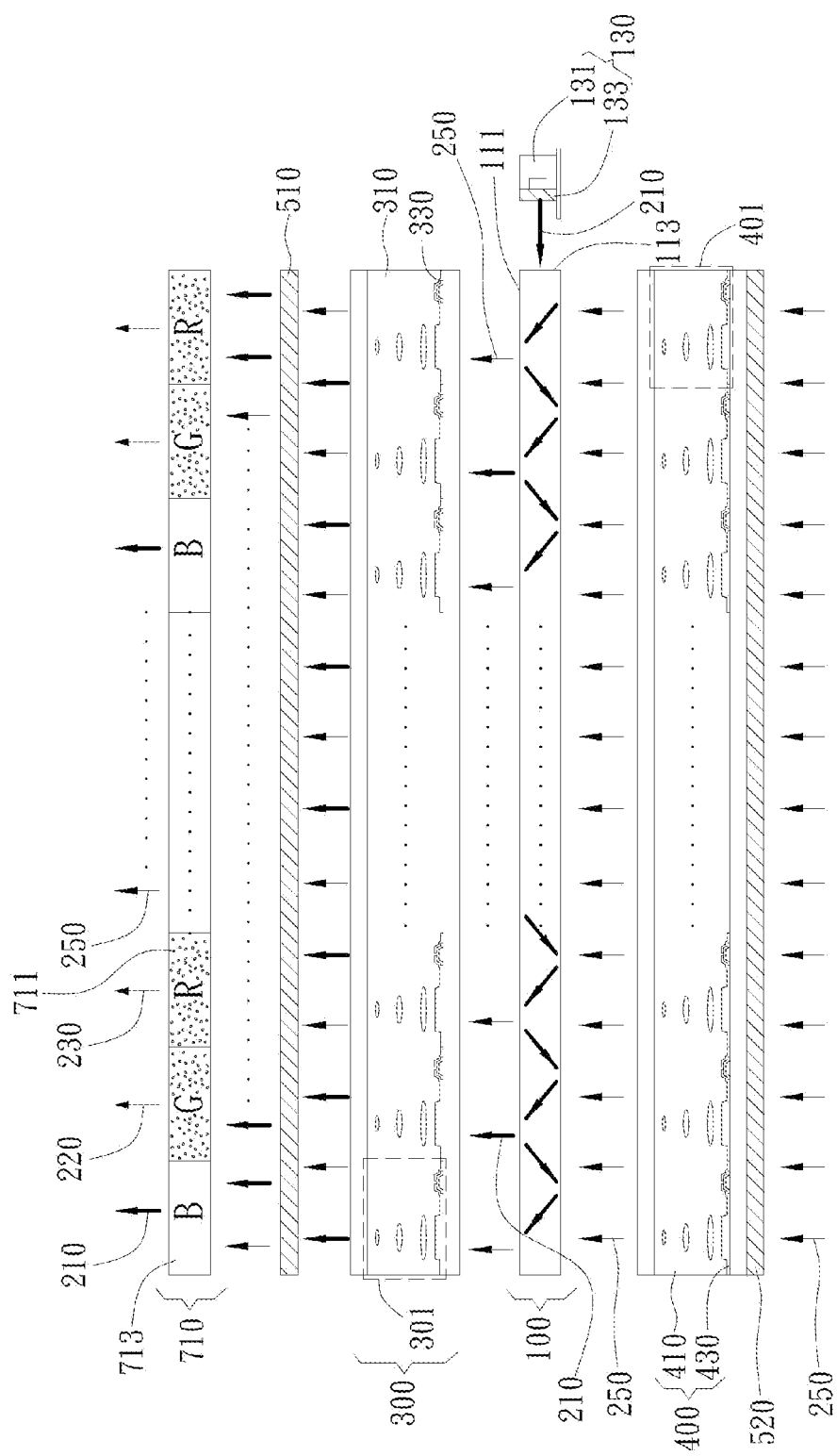
FIG. 7 is a cross-sectional view of another embodiment of the present invention.

In the embodiment shown in FIG. 7, the display device further includes a second light modulation module 400 and a second polarizer layer 520. The second light modulation module 400 is disposed on a side of the light source module 100 facing away from the first light modulation module 300. In terms of the preferred embodiment, the light modulation module 400 is disposed on a side of the light guide plate 110 facing away form the first light-emitting surface 113. The second light modulation module 400 includes a second liquid crystal layer 410 and a second control circuit layer 430 that controls the second liquid crystal layer 410. A plurality of second pixel units 401 are distributed on the second light modulation module 400. The second pixel units 401 are separately aligned or correspond to the first pixel units 301. The second control circuit layer 430 receives external control signals to produce voltage at the electrodes in the second control circuit layer 430 such that the orientation of the liquid crystal molecules within the second liquid crystal layer 410 may be controlled. For instance, in twisted nematic types of driving liquid crystals, when the second control circuit layer 430 does not generate voltage, the liquid crystal molecules form a screw-like alignment. When the second control circuit layer 430 decreases the voltage or generates no voltage, the angle of rotation of the liquid crystal molecules becomes smaller or is perpendicularly aligned.

Figure 8:
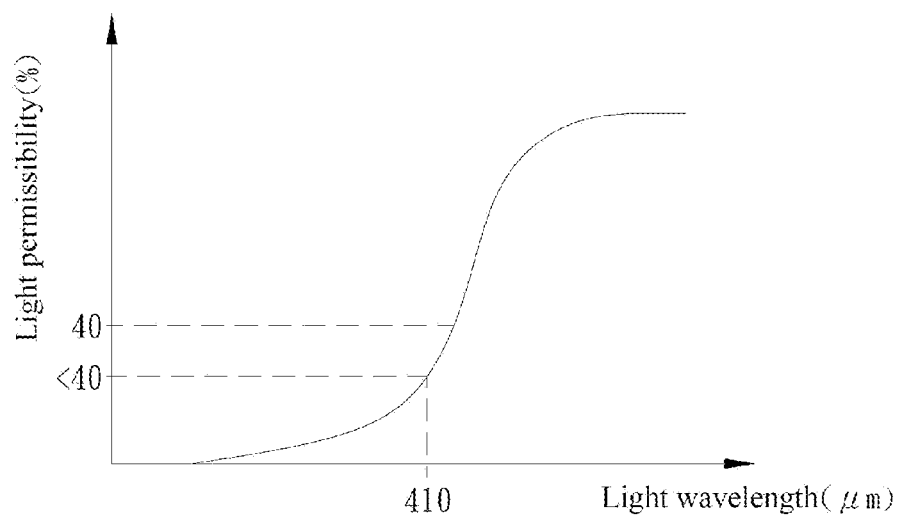
FIG. 8 is a diagram of the relationship between light transmittance and light wavelength of the second polarizer layer of the present invention.

The second polarizer layer 520 is disposed on a side of the second light modulation module 400 facing away from the light source module 100. The background light 250 enters the display device through the second polarizer layer 520 from behind the display device. The second polarizer layer 520 has a second polarization direction that may have the same polarization direction or have a polarization direction perpendicular to the polarization direction of the first polarization direction. The background light 250 is polarized as it passes through the second polarizer layer 520 such that it has the same polarization direction as the second polarization direction. In addition, in a preferred embodiment, the second polarizer layer 520 has a light transmittance of 40% for light with wavelength of 410 nm and polarization direction the same as the second polarization direction. The embodiment shown in FIG. 8 illustrates the relationship between the wavelength and light transmittance of incident of light entering the second polarizer layer 520. As shown in FIG. 8, the curve of the second polarizer layer 520 is more rightly shifted relative to the curve shown in FIG. 4 of the first polarizer layer 510. This partially filters out light of wavelengths of no more than 410 nm within the background light 250. Through this design, the excitation of phosphors to produce different colored lights after the background light 250 enters the first color modulation layer 710 may be reduced so that the image quality of the display device will not be affected.

The purpose of the present embodiment is to provide users control over the display device as to whether the display device can be transparently viewed or not. In other words, the display device allows users to see or block the background behind the display device. In order to accomplish this effect of controlling the transparent viewing, the second control circuit layer 430 controls the orientation of the second liquid crystal layer 410 within each of the second pixel units 401 in accordance to the orientation of the first liquid crystal layer 310 within each of the first pixel units 301 controlled by the first control circuit layer 330. After being polarized through the second polarizer layer 520, the background light 250 passes through and is selectively modulated by the second liquid crystal layer 410 and the first liquid crystal layer 310 before arriving at the first polarizer layer 510. The first polarizer layer 510 then blocks, partially blocks, or does not block the background light 250 from passing through in accordance to the polarization of the background light 250 after passing through the first light modulation module 300. If the background light 250 is allowed to pass through the first polarizer layer 510, the display device is transparent or can be transparently viewed through the device. On the other hand, if the background light 250 is not allowed to pass through, the display device is a non-transparent device. Since the orientation of the liquid crystal molecules of the first liquid crystal layer 310 is mainly based on the images to be displayed, they are therefore mainly controlled by the image control signal. In this instance, the display device would only need the second control circuit layer 430 to control the orientations of the second liquid crystal layer 410 to accomplish the goal of controlling whether the background light 250 may pass through or not. In addition, through controlling the orientation of the second liquid crystal layer 410, the amount of background light 250 passing through may also be controlled such that between fully transparent and non-transparent, the transparency level of the display device may be adjusted.

Figure 9A:
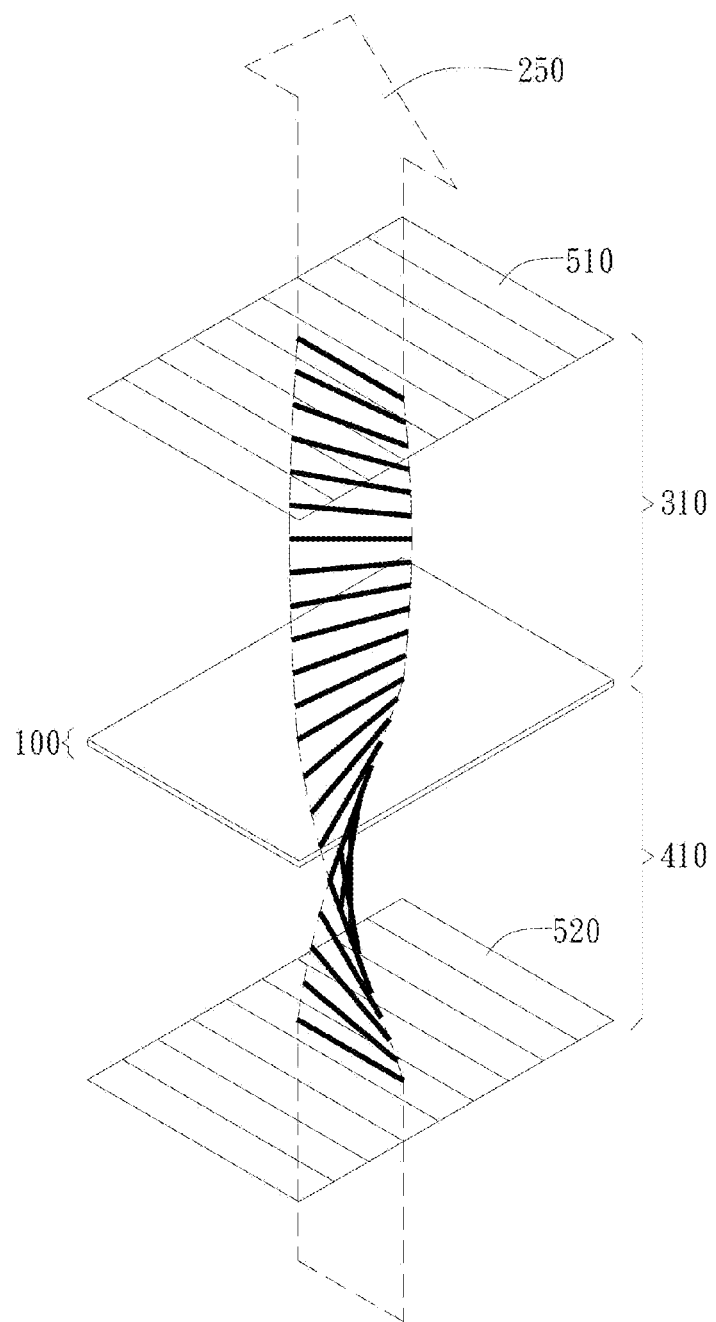
FIGS. 9A and 9B are diagrams of modulating the polarization direction of the background light.
Figure 9B:
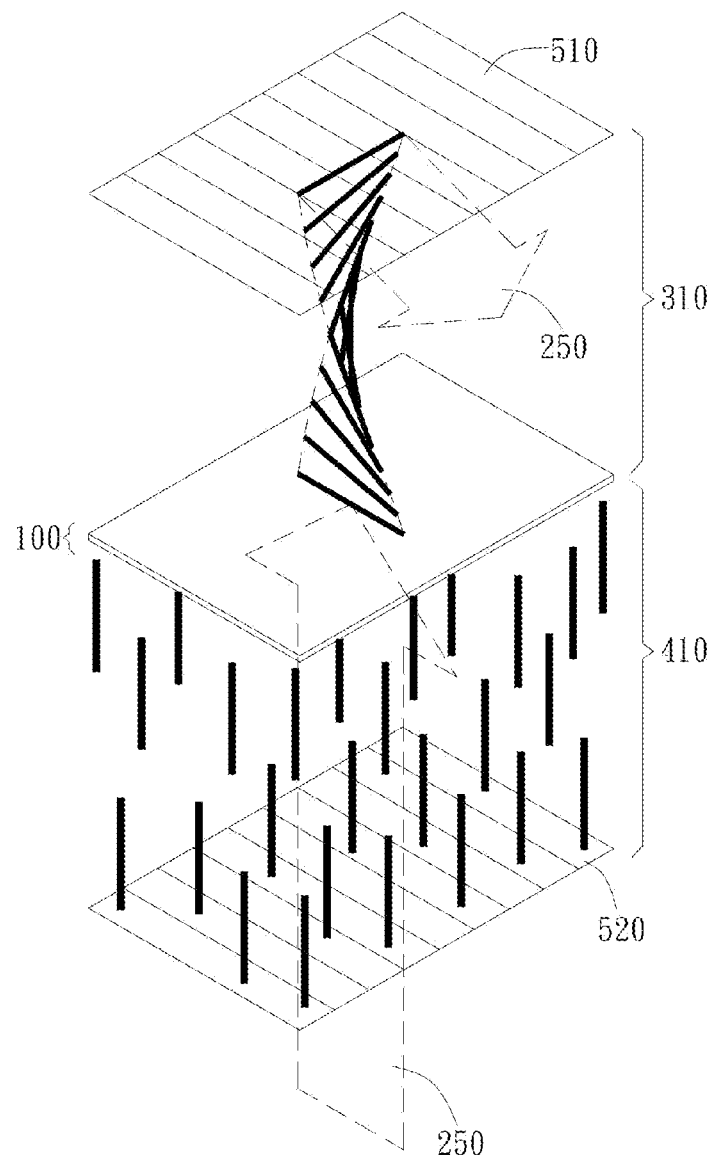

For example, as shown in FIG. 9A, when the polarization direction of the second polarizer layer 520 is parallel to the polarization direction of the first polarizer layer 510 and the twist angle of the liquid crystal molecules of the first liquid crystal layer 310 is 90 degrees, the twist angle of the liquid crystal molecules of the second liquid crystal layer 410 are also correspondingly controlled to be 90 degrees such that the polarization direction of background light 250 is parallel to the polarization direction of the first polarizer layer 510 after being rotated 90 degrees twice. This allows the background light 250 to pass through the first polarizer layer 510 and produce a transparent viewing effect for the display device. Conversely, as shown in FIG. 9B, when the polarization direction of the second polarizer layer 520 is parallel to the polarization direction of the first polarizer layer 510 and the twist angle of the liquid crystal molecules of the first liquid crystal layer 310 is 90 degrees, if the display device is set to be non-transparent, the alignment of the liquid crystal molecules of the second liquid crystal layer 410 may be controlled to be perpendicular to substrate such that the polarization direction of the background light 250 is not changed after passing through the second liquid crystal layer 410. In this instance, the polarization direction of the background light 250 is only rotated 90 degrees and is perpendicular to the polarization direction of the first polarizer layer 510. Therefore, the background light 250 will be blocked by the first polarizer layer 510 to produce a non-transparent effect for the display device.

Figure 10:
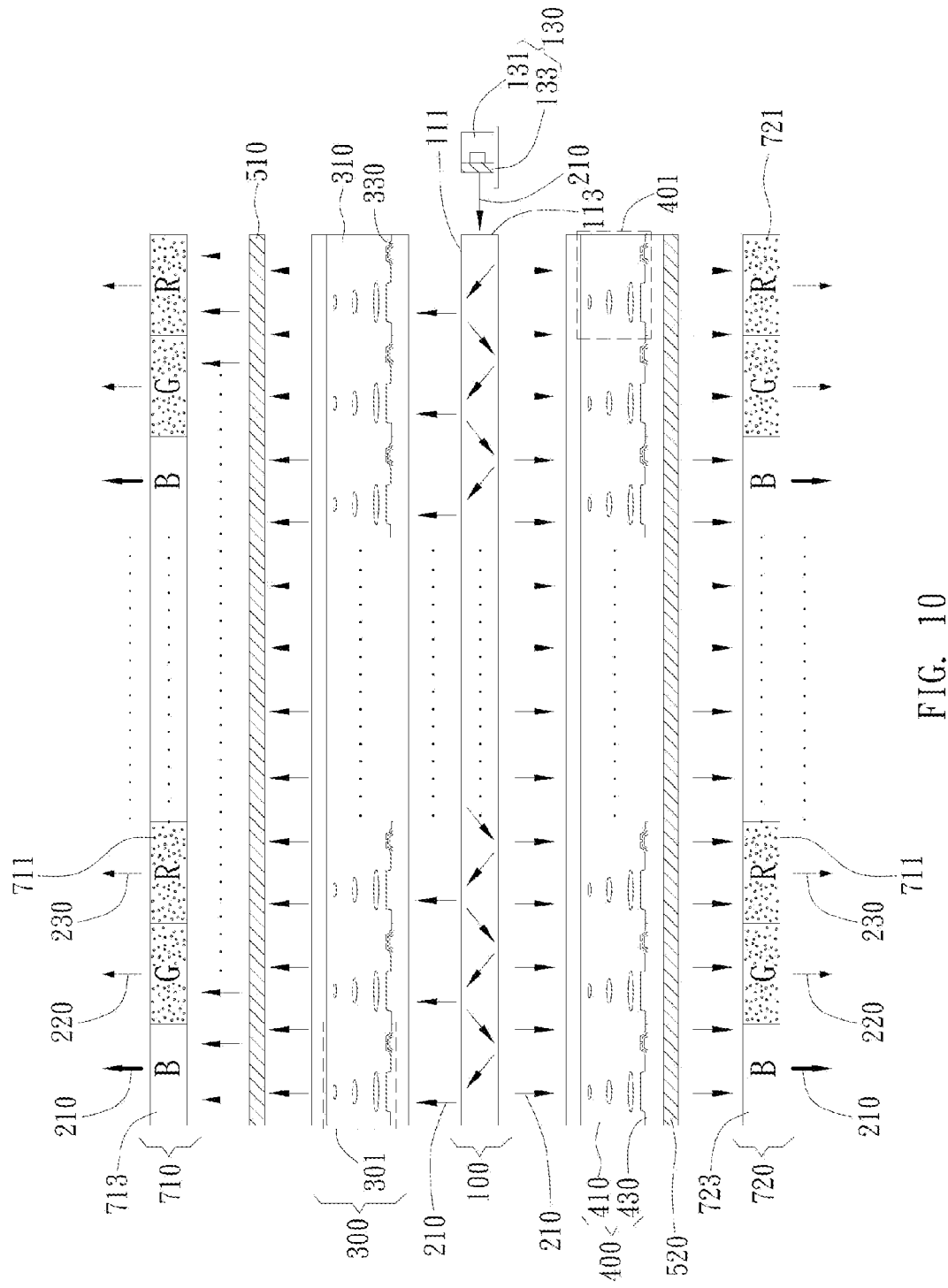
FIG. 10 is a cross-sectional view of another embodiment of the present invention.

In the embodiment shown in FIG. 10, the display device further includes a second color modulation layer 720. The second color modulation layer 720 is disposed on a side of the second polarizer layer 520 facing the second light modulation module 400. In this present embodiment, images can be displayed on the two sides of the display device. In this instance, the second color modulation layer 720 is preferably disposed similarly to the way the first color modulation layer 710 is disposed, wherein the second color modulation layer 720 receives the first color light 210 from the light source module 100 to generate the same effect as the first color modulation layer 710. The second light modulation module 400 and the second polarizer layer 520 are also disposed similarly to the first light modulation module 300 and the first polarizer layer 510 such that the two sides of the display device may display the same or different images. In a preferred embodiment, the second color modulation layer 720 has a plurality of second color modulation units 723 corresponding to different second pixel units 401. Each second color modulation unit 723 includes photoluminescent material to be excited by the first color light 210 that has passed through the second light modulation module 400 and the second polarizer layer 520 in order to generate the second color light 220 or the third color light 230.

Figure 11:
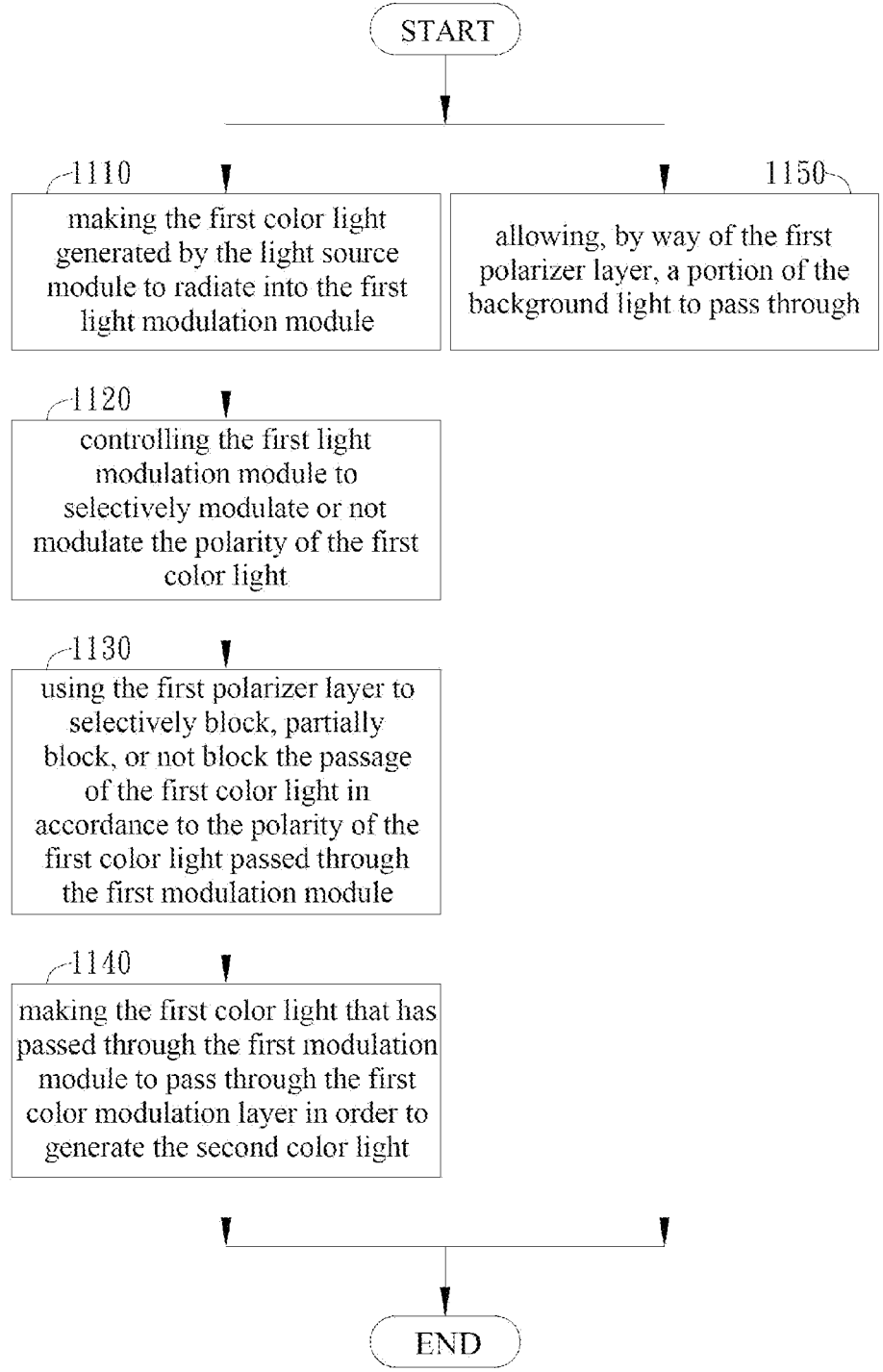
FIGS. 11 and 12 are flow chart diagrams of the image display method of the present invention.

As shown in the embodiment in FIG. 11, the image display method of the present invention preferably includes the following steps. Step 1110 includes allowing the first color light 210 generated by the light source module 110 to enter the first light modulation module 300. Step 1120 includes controlling the first light modulation module 300 to selectively modulate or not modulate the polarization direction of the first color light 210. In the present step, it is preferable that the first control circuit layer 330 of the first light modulation module 300 control the orientation of the liquid crystal molecules of the first liquid crystal layer 310 in each of the first pixel units 301 such that the polarization of the first color light 210 at each first pixel unit 301 may be selectively modulated.

Step 1130 includes using the first polarizer layer 510 to selectively block, partially block, or not block the first color light 210 in accordance to the polarization of the first color light 210 passed through the first modulation module 300. In other words, when the first color light 210 at a particular first pixel unit 301 has the same polarization direction as the first polarizer layer 510, this portion of the first color light 210 is allowed to pass through. Conversely, if the first color light 210 at a particular first pixel unit 301 has a polarization direction perpendicular to the first polarizer layer 510, this portion of the first color light 210 is blocked by the first polarizer layer 510.

Step 1140 includes making the first color light 210 that has passed through the first polarizer layer 510 to pass through the first color modulation layer 710 in order to generate the second color light 220. In the present step, the first color light 210 preferably excites the photoluminescent material in the first color modulation layer 710 to generate the second color light 220. The second color light 220 is preferably a green or red light. However, in other different embodiments, the second color light 220 may be a yellow light or a combination of lights that form white light. In addition, the first color light 210 may also directly pass through specific positions of the first polarizer layer 510 such that the first color light 210 may remain the same.

Step 1150 includes allowing the background light 250 to partially pass through the first polarizer layer 510. The background light 250 enters from behind the light source module 100 and passes through the first light modulation module to be selectively modulated with respect to its polarization direction. The portion of the background light 250 having the same polarization direction as the polarization direction of the first polarizer layer 510 will not be blocked by the first polarizer layer 510. In other words, that portion of the background light 250 may pass through the first polarizer layer 510. In this instance, the display device may display images while simultaneously also be transparently viewed through to see the background behind the display device. On the other hand, although the portion of the background light 250 having polarization direction perpendicular to the polarization direction of first polarizer layer 510 will be blocked by the first polarizer layer 510, the display device can still maintain the effect of transparent viewing.

Figure 12:
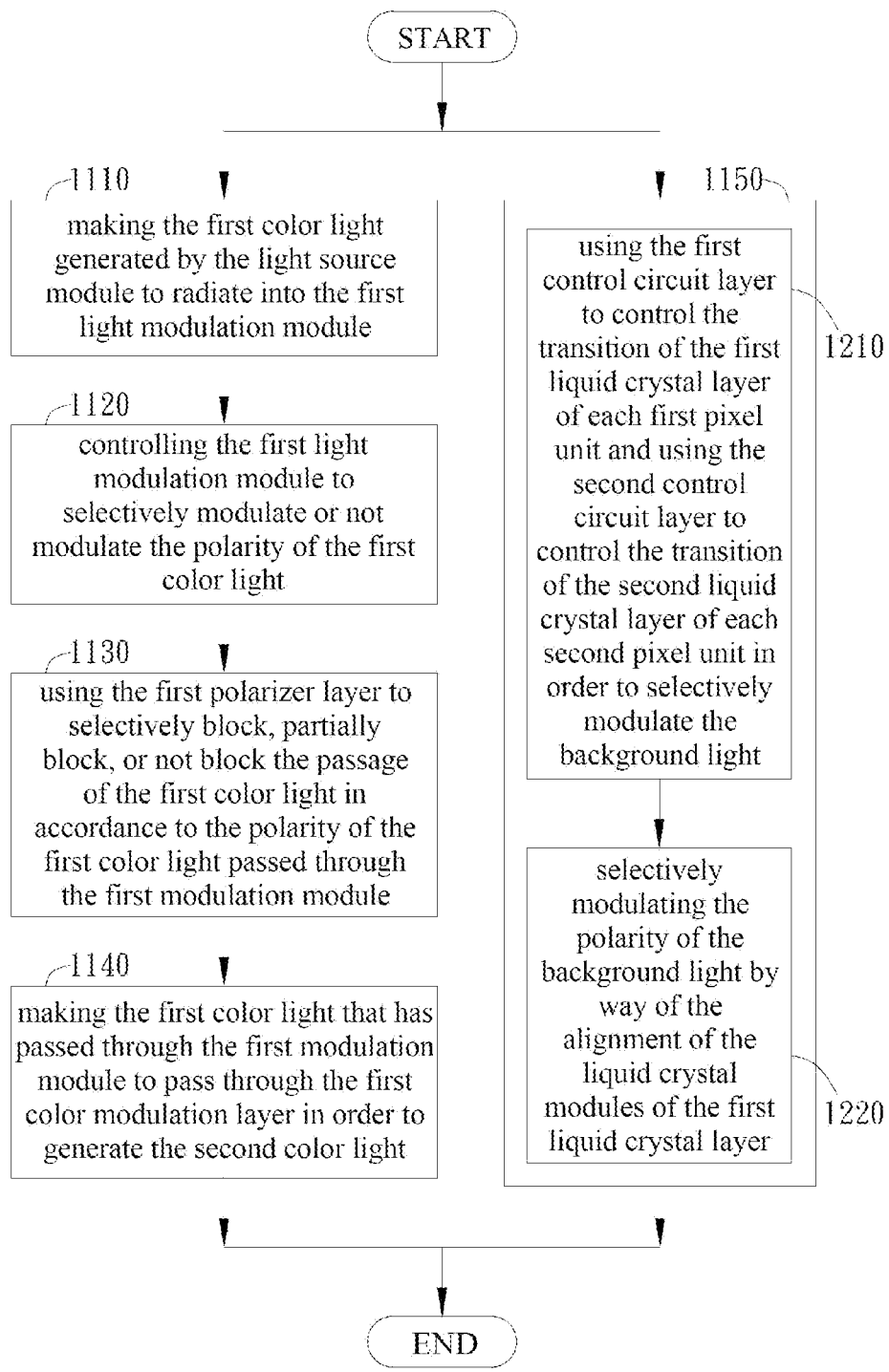

In another embodiment as shown in FIG. 12, step 1150 may include two different portions of step 1210 and step 1220. Step 1210 includes using the first control circuit layer 330 to control the orientation of the first liquid crystal layer 310 in each first pixel unit 301 and using the second control circuit layer 430 to control the orientation of the second liquid crystal layer 410 in each second pixel unit 401 in order to selectively modulate the polarization of background light 250. Step 1220 includes selectively modulating the polarization direction of the background light 250 by controlling the alignment of the liquid crystal modules of the first liquid crystal layer 310. The alignment of the liquid crystal molecules of the first liquid crystal layer 310 is driven by the image control signal that controls the formation of images on the display device. In this manner, users are able to control the display device to be transparent, partially transparent, or not transparent while the display device is displaying images. Steps 1210 and 1220 proceed at the same time such that the orientations in the first liquid crystal layer 310 and the second liquid crystal layer 410 may be switched simultaneously in order to effectively control the on/off status of the transparent viewing effect of the background light. The first liquid crystal layer 310 is used to modulate light coming from the polarized light source 130 in order to display images. The second liquid crystal layer 410 modulates the background light 250 in accordance to the first liquid crystal layer 310 to control the transparency effect of the background.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A transparent display apparatus, comprising:
   a light source module having a polarized light source generating a first color light, the light source module further having a transparent light guide plate configured to receive the first color light along an edge and emit the first color light out a light-emitting surface which is substantially perpendicular to the edge, the light guide plate being substantially transparent to allow a background light at a surface opposite the light emitting surface to pass through such that both the background light and the first color light are emitted from the light-emitting surface;
   a first light modulation circuit module disposed on the light source module, wherein the first light modulation circuit module receives the first color light and selectively modulate or does not modulate the polarization direction of the first color light;
   a first polarizer layer disposed on a side of the first light modulation circuit module facing away from the light source module and receiving the first color light and the background light passing through the first light modulation circuit module, wherein the first polarizer layer, according to the polarization direction of the first color light passing through the first light modulation circuit module, selectively blocks, partially blocks, or does not block the first color light, and the first polarizer layer has a light wavelength range where the first polarizer layer has lower light transmittance for incidence light of shorter wavelength and allows the first color light to pass through at a higher transmittance than the background light; and
   a first color modulation layer having light transmittance properties and disposed on a side of the first light modulation circuit module facing away from the first polarizer layer, the first color modulation layer has a photoluminescent material that is excited by the first color light of the light wavelength range to generate a second color light and display an image after the first color light passing through the first polarizer layer enters the first color modulation layer, and the background light passing through the first polarizer layer passes through the first color modulation layer and generates a see-through effect.

2. The display apparatus of claim 1, wherein the light transmittance of the first color modulation layer is greater than 80%.

3. The display apparatus of claim 1, wherein the first color light is chosen from blue light or ultra violet light.

4. The display apparatus of claim 1, wherein the wavelength of the first color light is not greater than 410 nm.

5. The display apparatus of claim 1, wherein the first polarizer layer has light transmittance of 40% for light with corresponding polarization direction and wavelength of 410 nm.

6. The display apparatus of claim 1, wherein the first light modulation circuit module comprises a first liquid crystal layer and a first control circuit layer controlling the first liquid crystal layer, and forms a plurality of first pixel units, the first color modulation layer is formed of a plurality of first color modulation units corresponding to the plurality of first pixel units, at least a portion of the plurality of first color modulation units comprises photoluminescent material to generate the second color light from excitation caused from the first color light passing through the first light modulation circuit module and the first polarizer layer.

7. The display apparatus of claim 6, wherein the first control circuit layer comprises a metallic circuit path and a shielding unit made of light absorbance material, and a projection of the shielding unit onto the metallic circuit path covers the metallic circuit path.

8. The display apparatus of claim 6, further comprising:
a second light modulation module disposed on a side of the light source module facing away from the first light modulation module, wherein the second light modulation module comprises a second liquid crystal layer and a second control circuit layer controlling the second liquid crystal layer, the second light modulation module forms a plurality of second pixel units separately corresponding to the plurality of first pixel units; and
a second polarizer layer disposed on a side of the second light modulation module facing away from the light source module, wherein background light is polarized after passing through the second polarizer layer and enters the second light modulation module;
wherein the second control circuit layer controls the orientation of the second liquid crystal layer within each of the second pixel units in accordance to the first control circuit layer controlling the orientation of the first liquid crystal layer within each of the first pixel units, the background light is selectively modulated through the second liquid crystal layer and the first liquid crystal layer before arriving at the first polarizer layer, the first polarizer layer selectively blocks, partially blocks, or does not block the background light in accordance to the polarization direction of the background light passing through the first light modulation module.

9. The display apparatus of claim 8, further comprising a second color modulation layer having a light transmittance property disposed on a side of the second polarizer layer facing the second light modulation module and forming a plurality of second color modulation units corresponding to the plurality of second pixel units, each of the second color modulation units separately comprises photoluminescent material to be excited by the first color light passed through the second light modulation module and the second polarizer layer to generate a third color light.

10. The display apparatus of claim 1, wherein the light-emitting surface of the light guide plate faces the first light modulation circuit module and the light guide plate has a light entrance surface formed on a side of the light-emitting surface, the light source module further comprises:
a polarized light source disposed corresponding to the light entrance surface and generating the first color light entering the light entrance surface;
wherein the first color light is guided by the light guide plate and emitted out through the light-emitting surface to the first light modulation circuit module.

11. The display apparatus of claim 10, wherein the first color light comprises a circular polarized light, the first polarizer layer is a circular polarizer layer.

12. The display apparatus of claim 10, wherein the first color light comprises a linear polarized light, the first polarizer layer is a linear polarizer layer.

13. The display apparatus of claim 10, wherein the polarized light source comprises:
a light source; and
a polarizer film covering the light source;
wherein light generated by the light source passed through the polarizer film forms the first color light.

14. The display apparatus of claim 1, wherein the first color light has a first color and is a polarized light, and the background light has the first color and a second color.

15. The display apparatus of claim 14, wherein the first polarizer layer has better transmittance for the second color of the background light.

16. An image display method for use in the display apparatus of claim 1, comprising:
making the first color light generated by the light source module to radiate into the first light modulation module;
controlling the first light modulation circuit module to selectively modulate or not modulate the polarization direction of the first color light;
using the first polarizer layer to selectively block, partially block, or not block the passage of the first color light in accordance to the polarization direction of the first color light passed through the first light modulation circuit module;
making the first color light passed through the first modulation circuit module to pass through the first color modulation layer in order to generate the second color light; and
using the first polarizer layer to selectively block, partially block, or not block the passage of the background light entering from behind the light source module in accordance to the polarization direction of the background light.

17. The image display method of claim 16, wherein the first light modulation circuit module comprises a first liquid crystal layer and a first control circuit layer controlling the first liquid crystal layer, forming a plurality of first pixel units, the first light modulation circuit module controlling step comprises using the first control circuit layer to control the orientation of the first liquid crystal layer in each first pixel unit in order to selectively modulate the first color light.

18. The image display method of claim 16, wherein the background light entering step comprises:
allowing the background light to enter a second polarizer layer and to pass through a second light modulation module to arrive at the light source module, wherein the second light modulation module comprises a second liquid crystal layer and a second control circuit layer controlling the second liquid crystal layer.

19. The image display method of claim 18, wherein the background light entering step comprises:
using a second control circuit layer to control the orientation of a second liquid crystal layer within each second pixel unit in accordance to the first control circuit layer controlling the orientation of the first liquid crystal layer within each first pixel unit in order to selectively module the background light; and
using the first liquid crystal layer to selectively modulate again the background light as being allowed to pass through the first polarizer layer or to be blocked by the first polarizer layer.

20. A transparent display apparatus, comprising:
a light source module having a polarized light source generating a first color light having a light wavelength range, the light source module further having a transparent light guide configured to receive the first color light along an edge and emit the first color light out a light-emitting surface which is substantially perpendicular to the edge, the light guide plate being substantially transparent to allow a background light at a surface opposite the light-emitting surface to pass through such that both the background light and the first color light are emitted from the light-emitting surface;
a first light modulation circuit module disposed on the light source module, wherein the first light modulation circuit module receives the first color light and selectively modulate or does not modulate the polarization direction of the first color light;
a first polarizer layer disposed on a side of the first light modulation circuit module facing away from the light source module and receiving the first color light and the background light passing through the first light modulation circuit module, wherein the first polarizer layer, according to the polarization direction of the first color light passing through the first light modulation circuit module, selectively blocks, partially blocks, or does not block the first color light, and the first polarizer layer has lower light transmittance for incidence light of shorter wavelength and allows the first color light to pass through at a higher transmittance than the background light; and
a first color modulation layer having light transmittance properties and disposed on a side of the first light modulation circuit module facing away from the first polarizer layer, wherein a second color light is generated to display an image after the first color light passing through the first polarizer layer enters the first color modulation layer, and the background light passing through the first polarizer layer passes through the first color modulation layer and generates a see-through effect.

* * * * *